US008423084B2

(12) United States Patent
Abramov et al.

(10) Patent No.: US 8,423,084 B2
(45) Date of Patent: Apr. 16, 2013

(54) METHOD FOR RADIO COMMUNICATION IN A WIRELESS LOCAL AREA NETWORK AND TRANSCEIVING DEVICE

(75) Inventors: Oleg Yurievich Abramov, St. Petersburg (RU); Aleksandr Nikolaevich Kirdin, St. Petersburg (RU); Yury Pavlovich Sukharnikov, St. Petersburg (RU)

(73) Assignee: Airgain, Inc., Carlsbad, CA (US)

( * ) Notice: Subject to any disclaimer, the term of this patent is extended or adjusted under 35 U.S.C. 154(b) by 2455 days.

(21) Appl. No.: 10/494,105

(22) PCT Filed: Oct. 31, 2002

(86) PCT No.: PCT/RU02/00489
§ 371 (c)(1),
(2), (4) Date: Sep. 2, 2004

(87) PCT Pub. No.: WO03/039027
PCT Pub. Date: May 8, 2003

(65) Prior Publication Data
US 2011/0096757 A1   Apr. 28, 2011

(30) Foreign Application Priority Data
Nov. 1, 2001   (RU) .................................. 2001130430

(51) Int. Cl.
*H04B 1/00*   (2006.01)
(52) U.S. Cl.
USPC ......................... 455/562.1; 370/330; 370/350
(58) Field of Classification Search .............. 455/562.1; 370/330–350
See application file for complete search history.

(56) References Cited

U.S. PATENT DOCUMENTS 3,766,558 A * 10/1973 Kuechken ..................... 342/375

4,549,293 A   10/1985 Christian
(Continued)

FOREIGN PATENT DOCUMENTS
EP   99112131   12/2000
RU   2 144 746 C1   1/2000
(Continued)

OTHER PUBLICATIONS

Supplementary European Search Report issued in related European Patent Application No. 02782048.9, on Oct. 14, 2010, 3 pages.

*Primary Examiner* — Marcos Batista
(74) *Attorney, Agent, or Firm* — Clause Eight IPS; Michael Catania

(57) ABSTRACT

Method for radio communication in a wireless local area network and transceiving device refers to wireless local area networks (WLAN) consisting of a multitude of transceiving devices of users (14, 15, 16 . . . N). Simultaneous scanning by their antenna beams in different directions by the transceiving devices (with the transceiving devices being in reception mode) and transmission of an omnidirectional signal in the form of calibration signal and data package by one of the transceiving devices of the network (with the transceiving device being in transmission mode), reception of the signal by the transceiving devices operating in reception mode and subsequent orientation of their antenna beams in the direction of signal source. The recognition and orientation is performed during the period of reception of the calibration signal. The Method increases the range of a WLAN, reduces the transmission time and improves quality and reliability of communication. Each transceiving device (1) includes at least one directional antenna (3) featuring a controllable directional pattern, switched-over by unit (4), reception/transmission mode switch (5), receiver (8), transmitter (10) and controller (11). Additionally a unit for signal detection (13) is incorporated in the device.

21 Claims, 9 Drawing Sheets

U.S. PATENT DOCUMENTS

| | | | |
|---|---|---|---|
| 5,471,660 A * | 11/1995 | Masaki ...................... | 455/161.2 |
| 5,546,397 A | 8/1996 | Mahany | |
| 5,748,676 A | 5/1998 | Mahany | |
| 5,828,658 A | 10/1998 | Ottersten et al. | |
| 6,026,303 A | 2/2000 | Minamisawa | |
| 6,028,853 A | 2/2000 | Haartsen | |
| 6,167,286 A * | 12/2000 | Ward et al. ................. | 455/562.1 |
| 6,192,230 B1 | 2/2001 | van Bokhorst et al. | |
| 6,370,369 B1 * | 4/2002 | Kraiem et al. ............. | 455/277.1 |
| 6,442,405 B1 * | 8/2002 | Hiramatsu et al. ......... | 455/562.1 |
| 2002/0167455 A1 * | 11/2002 | Yordy, Sr. .................... | 343/853 |

FOREIGN PATENT DOCUMENTS

| | | |
|---|---|---|
| WO | PCT/DE96/00020 | 7/1996 |
| WO | 0139320 | 5/2001 |

* cited by examiner

METHOD FOR RADIO COMMUNICATION IN A WIRELESS LOCAL AREA NETWORK AND TRANSCEIVING DEVICE

FIELD OF THE INVENTION

The invention claimed herein refers to wireless local communication networks (WLAN), namely, to methods and equipment used in said networks for the purpose of transmission/reception of various types of information.

BACKGROUND OF THE INVENTION

Currently wireless local communication networks are finding more and more extensive use in the field of information science and videographic communication for the purpose of transmission and distribution of data/information among multiple users located inside the same building (for example, among personal computers, laptop computers, printers and other users located in the same building without any restrictions on the "mobility" of these devices). Transmission of information with the use of WLAN allows one to reduce cost because there is no necessity of laying connecting wires. A network of this type could be also used in those cases when it is either difficult or impossible to lay connecting wires and in cases when there are no socket connectors for local area networks due to architectural restrictions. WLAN represents an ideal solution for a facility at which the arrangement of users is often changed. In existing WLANs, radio communication is usually arranged in compliance with known international standards—for example, such as IEEE 802.11b.

A number of known methods for radio communication in WLAN are based on the use of omnidirectional antennas for signal transmission/reception (See U.S. Pat. Nos. 6,026,303; 6,028,853; 6,192,230). These methods and appropriate equipment enable one to arrange temporary (ad hoc) networks intended for the simultaneous transmission of information to an arbitrary number of users (including users that change their location).

For instance, the method of operation of a wireless data exchange system between multiple wireless stations described in (See U.S. Patent No. 6,192,230) includes the broadcasting of one of the stations (that will transmit data), broadcasting of synchronizing messages and identification of those stations (among a set of stations) for which said data were transmitted. Said method also includes switching of stations selected in the course of broadcasting of said synchronizing messages into an operation mode characterized by relatively high level of power, switching of other stations (i.e. stations for which said data were not intended) into standby mode characterized by relatively low level of power, broadcasting of all data to selected stations and switching the former into standby mode characterized by relatively low level of power following the reception of said data.

The known method allows one to save resources of self-contained power supply sources of network users. At the same time the employment of the omnidirectional radiation of signals imposes a limitation on the network range determined predominantly by the radiation power of a transceiving device and sensitivity of its receiver, which parameters as a rule cannot be significantly improved for WLAN users. In addition, the known method doesn't ensure sufficient reliability of radio communication due to the possibility of emergence of multipath interference in the signal reception point and due to the signal fading effect.

Another transceiving device is known in the art, which is intended for use by WLAN users. This transceiving device comprises a transceiver equipped with an omnidirectional antenna (with said transceiver being connected to a bus, to which a processor, memory and standby mode timer, which in their turn are connected to a self-contained power supply source) connected to transceiver via a switch connected to said standby mode timer and power control circuit (See U.S. Pat. No. 6,192,230).

The known transceiving device increases the service life of a self-contained power supply source of network users. At the same time employment of an omnidirectional antenna in the device limits the network range determined predominantly by the radiation power of a transceiving device and sensitivity of its receiver, which parameters as a rule cannot be significantly improved for mobile WLAN users that are powered from a self-contained source. In addition, the known device doesn't ensure sufficient reliability of radio communication due to the possibility of emergence of multipath interference in the signal reception point and due to the signal fading effect.

Different variants of diversity antenna method and transceivers (that serve as a practical implementation of this method) are widely used to upgrade the reliability of radio communication in WLAN. With this method information is received by an antenna that provides the best quality of a signal being received (See U.S. Pat. Nos. 5,546,397; 5,828, 658; 5,748,676).

For instance, U.S. Pat. No. 5,748,676 presents a method for radio communication intended for use in communication networks, in which a receiver has the multitude of antennas. Selection of antenna providing the best conditions of signal reception is performed in the course of reception of a preamble of a data package being transmitted. While enabling one to minimize the influence of signal fading the known method still has the same limitations on the network range that are inherent to methods employing omnidirectional radiation for the purpose of information transmission/reception.

Another transceiving device to be used in WLAN is known (See U.S. Pat. No. 5,748,676). This transceiving device comprises a multitude of antennas connected to a switch by means of which an antenna characterized by the best performance characteristics is switched for radio communication in the course of transmission of data package preamble.

While enabling one to minimize the influence of signal fading the known transceiving device still has the same limitations on the reach range or range of action that are inherent to methods employing omnidirectional radiation for the purpose of information transmission/reception.

In terms of the entire set of essential features, the method for radio communication in a wireless local area network including the transmission (by means of an omnidirectional antenna) of a calibration signal by one transceiving device to another transceiving device that receives this signal also by means of an omnidirectional antenna, identification of the antenna that ensures the best conditions for signal reception among the multitude of omnidirectional antennas of the second transceiving device, transmission of a calibration signal by the second transceiving device via the selected antenna (this calibration signal serves to select the best directional antenna of the first transceiving device in terms of the quality of signal reception), and subsequent radio communication by means of directional antennas of the first and second transceiving devices (those directional antennas that were selected in the course of transmission of said calibration signals) represents the closest analog to the invention being claimed herein (See EPO Application Serial No. 99112131). This is referred to as the reference method.

The use of directed radiation from transceiving devices in the known reference method ensures sufficient reliability of radio communication due to the lowered influence of multipath interference and signal fading. At the same time setting up radio communication at the first stage through the use of an omnidirectional radiation pattern doesn't allow one to increase the range of WLAN users as compared to methods employing diversity antennas. Besides, the use of the known reference method implies that prior to broadcasting a data package it is necessary to transmit a calibration signal twice, which prolongs radio communication session. When it is required to transmit a data package to several users the duration of data package transmission increases in proportion to the number of these users.

The known reference method is implemented by means of transceiving devices (See EPO Application Serial No. 99112131), each of which comprise at least one directional antenna and one omnidirectional antenna with both said antennas being connected via an antenna switchover unit to a movable contact of the reception/transmission mode switch, the fixed contacts of which are connected respectively to receiver input port and transmitter output port. The first output port of the receiver is connected to the first input port of the controller, the second output port of the receiver is connected to the input port of the signal quality measurement unit, the output port of which is connected to the second input port of the controller. The first output port of the controller is connected to the antenna switching unit, the second output port of the controller is connected to the first input port of the transmitter, and the third output port of the controller is connected to the second input port of the transmitter. The controller is capable of two-way communication with a memory unit and user interface.

The known reference transceiving device allows one to enhance the reliability (quality) of radio communication between two users due to the reduction in the multipath interference and signal fading. However, these advantages are attained at a sacrifice of increase in transmission time of each data package and absence of a possibility of simultaneous transmission of data to several users in a network. The known reference transceiving device doesn't enable one to increase the range of WLAN as compared to methods employing diversity antennas because at the first stage of communication both transmission and reception are carried out by means of omnidirectional antennas.

SUMMARY OF THE INVENTION

The purpose of the present invention consists in creating such a method for radio communication in a WLAN and developing such a WLAN transceiving device, which while having the advantages offered by the reference system would enable one to increase the WLAN range, to increase the data transfer rate, to improve the quality and reliability of communication, to transmit information to several users of a network simultaneously (including mobile users) and to reduce the transmission time.

This advantage is achieved due to the fact that the following steps are carried out in a method for radio communication in a WLAN consisting of a multitude of transceiving devices:

a) simultaneous scanning by the antenna beam in different directions by each transceiving device of the local area network (with said transceiving devices being in reception mode) and transmission of an omnidirectional signal (in the form of a calibration signal) and data package by one of the transceiving devices of said network (with said transceiving device being in transmission mode);

b) reception of the signal as a result of said signal scanning by transceiving devices and subsequent orientation of their antenna beams in the direction of signal source (said recognition and orientation being performed during the period of reception of said calibration signal);

c) subsequent reception of one or several data packages from the direction at which the antenna beam has been oriented.

In the method claimed herein said scanning can be carried out in different ways—namely, by azimuth bearing or/and angle of elevation. It is also possible to perform step-by-step scanning by switching of antenna directional pattern. Step-by-step scanning can be also performed both in a pre-specified part of radio space offering better conditions for signal reception and in the entire radio space with a pitch of 45°, 60°, 90°, 120° or 180°. Besides, other scanning methods can be used (in addition to the above-named).

Scanning and orientation of antenna beams of transceivers in the direction of signal source can be repeated in the process of transmission of each data package with the aim to respond properly to variations in conditions of signal passage (in particular, in the case when network users are mobile units).

In addition, the recognition of the signal is performed in the course of this signal reception in order to subsequently direct the antenna beam of the transceiving device towards the signal source.

Orientation of antenna beams of transceivers in the direction of a signal source can be determined based on the maximum value of at least one of the measured energy-related parameters of a signal being received—for instance, based on the maximum value of signal level or based on the maximum value of the signal-to-noise ratio. To do so, the value of an energy-related parameter of a signal being received can be measured for different polarization of this signal. Subsequent reception of data package would be then carried out with a signal polarization with which a value of energy-related parameter takes the maximum value.

With data package reception completed, the scanning is resumed. To determine the end of a data package, one can measure at least one of the energy-related parameters of the received signal in the course of data package reception (for example, signal level or signal-to-noise ratio), and when the value of this parameter goes below a specified threshold value, the scanning is resumed.

The preamble of the data package to be transmitted can be used as a calibration signal.

To avoid signal collision, it is recommended to scan radio space (for instance, by azimuth bearing within 360° range or by azimuth bearing and angle of elevation within the sphere or hemisphere depending on the users' location) prior to data package transmission.

Upon the completion of transmission a transceiver, as a rule, is switched into reception mode accompanied by scanning the antenna beam in different directions.

The task stated above is also performed by means a transceiving device for use in a WLAN. The transceiving device includes a direction—agile antenna and means for operating antenna in an omni-directional mode, a scanning directional mode, and a stationary directional mode. The transceiving device also includes a signal identification unit responsive to a transmission signal including a calibrated signal for converting antenna from scanning directional mode to stationary direction mode in the direction from which transmission signal is received.

The means for operating the antenna in the above said modes can include means responsive to user command for transmitting an omni-directional signal including said calibration signal, means for operating the antenna in the scanning directional mode when the said calibration signal is not detected and means responsive to user command for disabling the means for maintaining the antenna in the scanning directional mode.

The transceiving device can comprise at least one directional antenna featuring controlled directional pattern, a unit for switching said directional pattern, a reception/transmission mode switch, a receiver, a transmitter, a unit for measuring signal quality, a controller and a unit for signal detection (the former is an additional unit that was missing in the reference device). The antenna is connected (via the unit for switching said directional pattern) with the first input port (it serves as the first input port when operating in the reception mode; and when operating in the transmission mode this port serves as the first output port) of the reception/transmission switch, the output port of which is connected to the input port of the receiver, and the second input port of which is connected to the output port of the transmitter. The output port of the receiver is simultaneously connected to the first input port of the controller, to the input port of signal quality measurement unit and to the input port of the signal detection unit, the output port of the signal quality measurement unit is connected to the second input port of the controller. The output port of the signal detection unit is connected to the third input port of the controller. The first output port of the controller is connected to the unit for switching said directional pattern, the second output port of the controller is connected to the input port of the transmitter, and the third output port of the controller is connected to a user (i.e. a device intended for the reception and/or transmission of information).

An antenna featuring controlled directional pattern can be made in different ways. For example, a transceiving device may be equipped with one antenna having at least two radiators with directional patterns that, taken together, cover no less than 360° by azimuth bearing or by the elevation angle, or with directional patterns that, taken together, cover no less than a hemisphere or sphere by azimuth bearing and by the angle of elevation.

A transceiving device may be also made with several antennas, each of them having either having only one radiator or multiple radiators, with directional patterns that, taken together, cover no less than 360° by azimuth bearing or by the angle of elevation, or with directional patterns that, taken together, cover a hemisphere or sphere by azimuth bearing and by the angle of elevation.

For example, a transceiving device may be made with single antenna having either three or six radiators, with directional patterns that, taken together, cover a hemisphere by azimuth bearing and by the angle of elevation.

A transceiving device may be also made with three or six antennas, each of which having single radiator, with directional patterns that, taken together, cover a hemisphere by azimuth bearing and by the angle of elevation.

A transceiving device may be also made with five antennas, each of which having single radiator, with directional patterns that, taken together, cover a sphere by azimuth bearing and by the angle of elevation.

A transceiving device may be also made with at least two antennas having single radiators and at least four antennas, each of which having at least two radiators, with directional patterns that, taken together, cover a sphere by azimuth bearing and by the angle of elevation.

It is also possible that other known design options of antennas with controlled directional pattern are employed in a transceiving device.

Simultaneous scanning of radio space by network users (that are in the reception mode) by means of a directional antenna and transmission of an omnidirectional calibration signal enable one, in contrast to the reference method in which transmission and reception of calibration signal is carried out by omnidirectional antennas, to increase the range as well as to increase the data transmission rate and to improve the quality and reliability of communication, while having the same power of transmitted signal as in the reference design. Subsequent omnidirectional transmission of information ensures simultaneous reception of this information by a multitude of users, while in the reference method and in the device implementing said reference method, the switchover to transmission/reception with the aid of directed antennas allows one to transmit information only to one user in the point-to-point mode, and to transmit this information to several users, one would have to repeat all steps of reception-transmission several times, which fact considerably increases the duration of information reception. Introduction of a signal detection unit in the device claimed herein enables one to avoid interruptions in scanning when a random/extraneous signal is received, thus avoiding loss of information (being transmitted to users) during the reception of said random/extraneous signal.

Transmission of information with the aid of directed and omnidirectional antennas is used in systems of communication between a mobile transceiving device (in particular, a mobile port of a cordless telephone) and stationary transceiving device (in particular, base station of a cordless telephone)—for example, see PCT/DE96/00020. However, in contrast to the invention claimed herein, a base station in the known method performs transmission of information by antenna radiation, in a partial radio space of which one mobile transceiving device equipped with an omnidirectional antenna is located. With several mobile transceiving devices located in different points of the radio space, a base station would have to carry out transmission practically in the omnidirectional mode, thus making this radio communication method no different from a communication method with the use of omnidirectional antennas with all disadvantages inherent to the former method.

BRIEF DESCRIPTION OF THE DRAWINGS

The various embodiments, features and advances of the present invention will be understood more completely hereinafter as a result of a detailed description thereof in which reference will be made to the following drawings.

DESCRIPTION OF A PREFERRED EMBODIMENT

Figure 8:
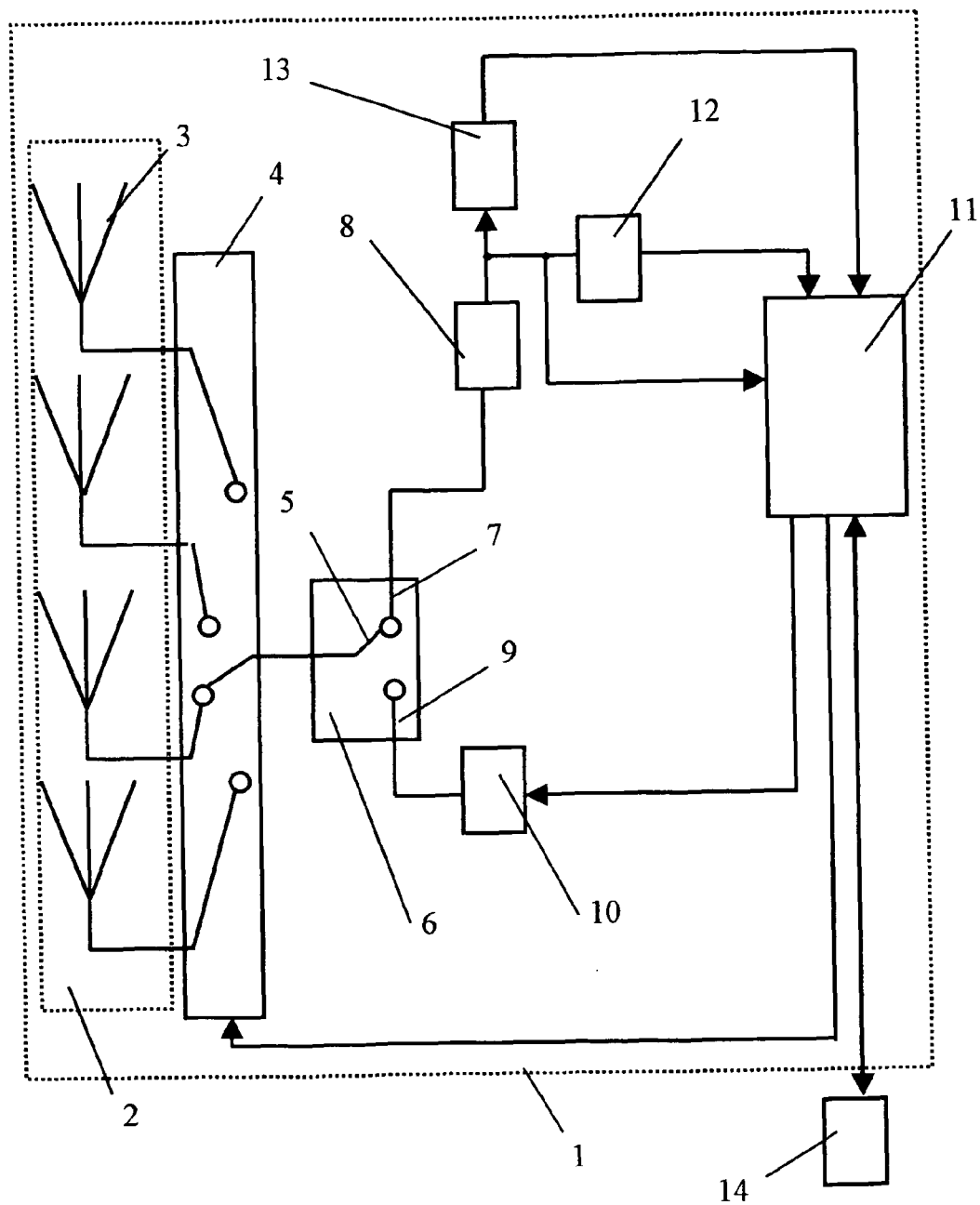
FIG. 8 presents a functional block diagram of the transceiving device when the latter operates in the reception mode.
Figure 9:
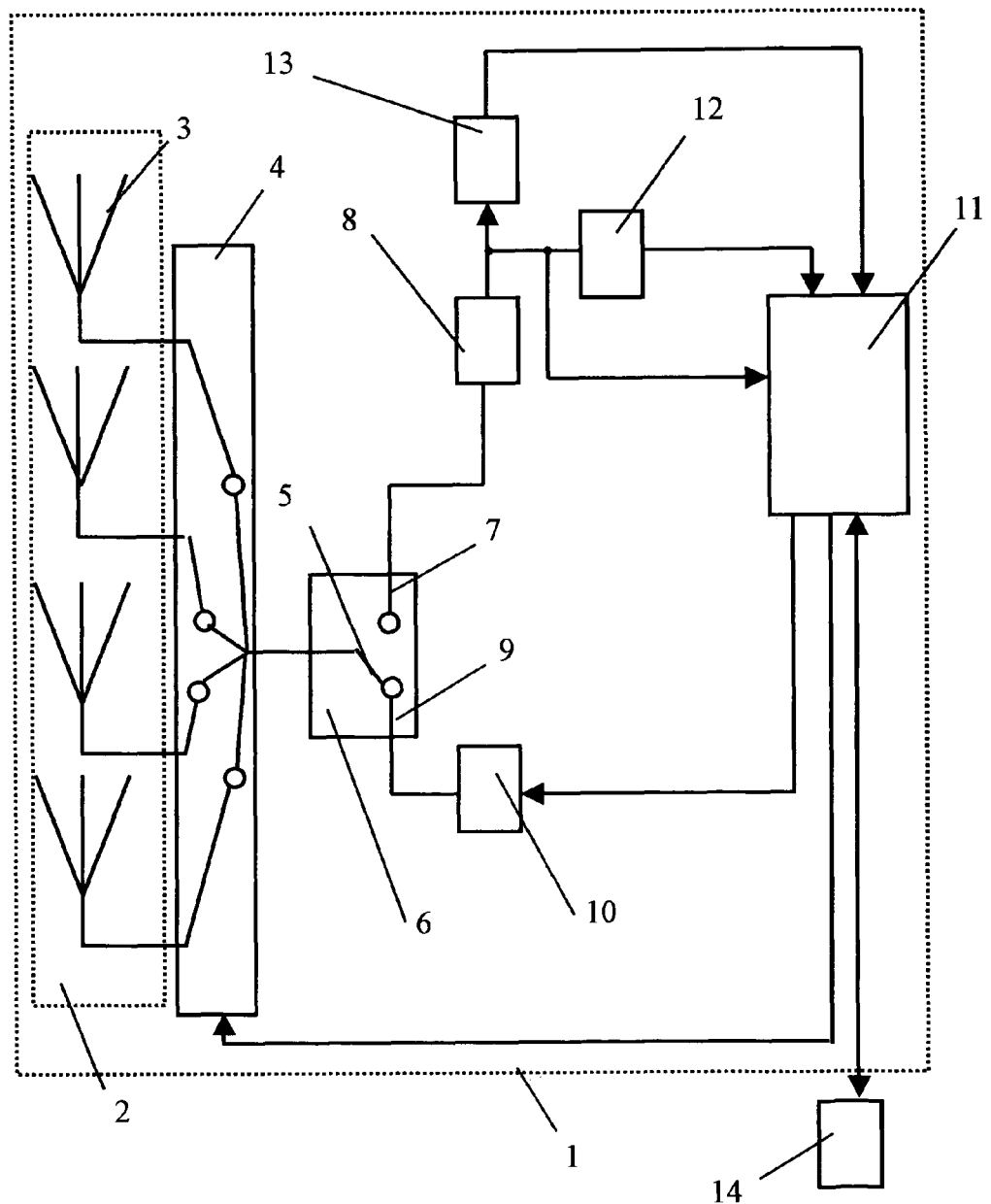
FIG. 9 presents a functional block diagram of the transceiving device when the latter operates in the transmission mode

The method for radio communication in a WLAN can be implemented using the transceiving device, which is shown in FIG. 8 and FIG. 9 in the transmission and reception modes correspondingly. The transceiving device 1 comprises antenna unit 2 consisting of at least one directional antenna 3 featuring a directional pattern controlled by means of a directional pattern switchover unit 4. In terms of design, antenna unit 2 can be made in different ways—namely, in the form of one antenna 3 with at least two radiators with directional patterns that, taken together, cover no less than 360° by azimuth bearing or by the angle of elevation; in the form of one antenna 3 with at least three radiators (for example, with four or six radiators) with directional patterns that, taken together, cover the hemisphere or sphere by the azimuth bearing and by the angle of elevation. Antenna unit 2 can be also made with at least two said antennas 3, with each antenna having at least one radiator, the directional patterns of which, taken together, cover no less than 360° by the azimuth bearing and by the angle of elevation. As an example, FIG. 8 and FIG. 9 show a design option of antenna unit 2 having four directional antennas, each of which has only one radiator. Unit 2 can be made with at least three said antennas (each of which has only one radiator) the directional patterns of which, taken together, cover the hemisphere or sphere by the azimuth bearing and by the angle of elevation. There are other design options for making antenna unit 2. Directional pattern switchover unit 4 is connected to the first input port 5 (it serves as the first input port when operating in the reception mode; and when operating in the transmission mode this port serves as the first output port) of reception/transmission switch 6. The second output port 7 of reception/transmission switch 6 is connected to the input port of the receiver 8, and the second input port 9 of reception/transmission switch 6 is connected to the output port of the transmitter 10. Output port of receiver 8 is simultaneously connected to the first input port of controller 11, to the input port of signal quality measurement unit 12 and to the input port of signal detection unit 13. The output port of the signal quality measurement unit 12 is connected to the second input port of the controller 11, to the third input port of which the output port of signal detection unit 13 is connected. The first output port of controller 11 is connected to the directional pattern switchover unit 4, the second output port of controller 11 is connected to the input port of transmitter 10, and the third output port of controller 11 is designed to connect the former to user 14 (i.e. a device intended for the reception and/or transmission of information).

The method for radio communication in a WLAN consisting of users 14, 15, 16 . . . N, each of which is equipped with a transceiving device 1 is implemented in the following manner.

Figure 1:
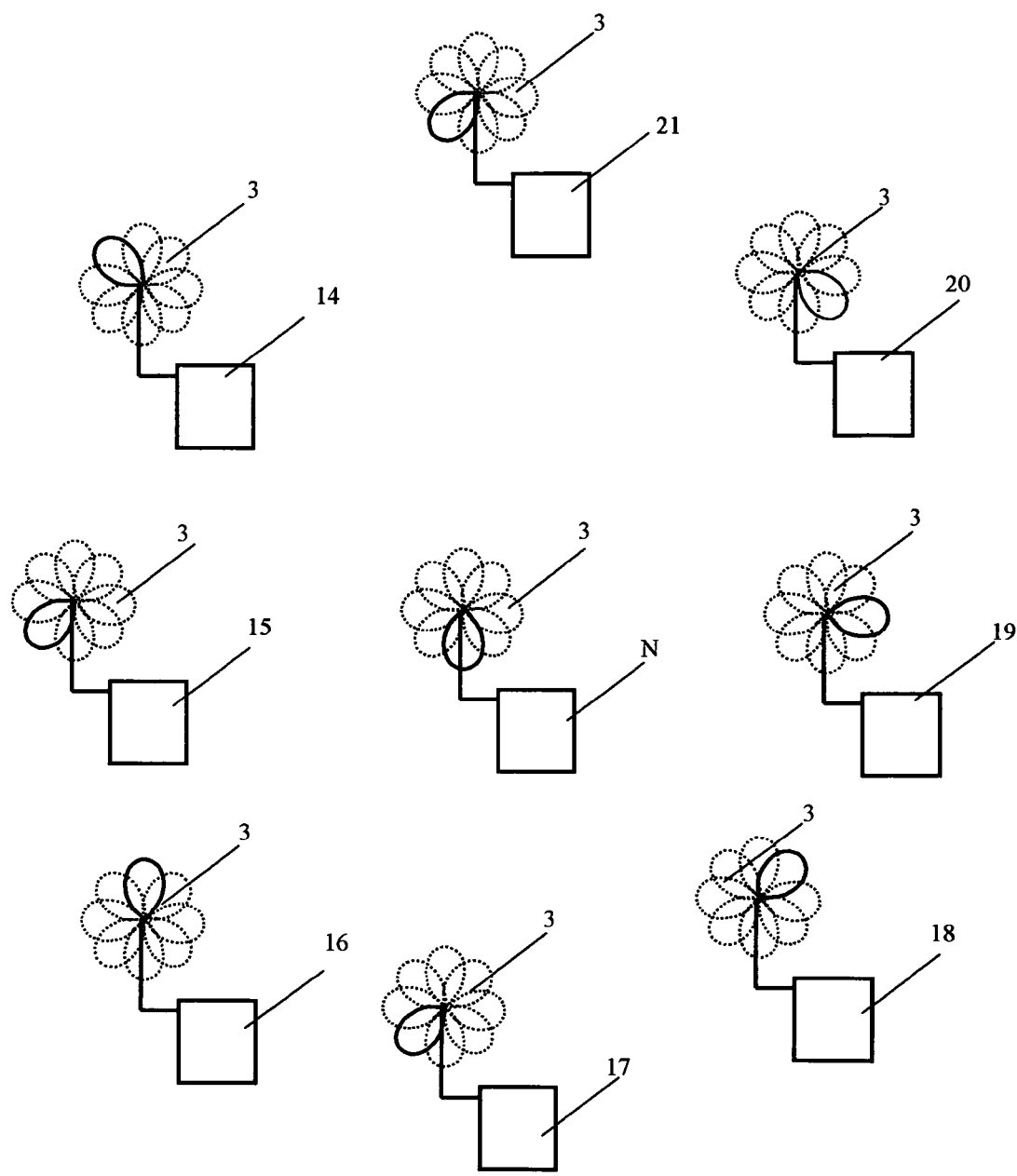
FIG. 1—schematically illustrates the operation of antennas of transceiving devices of WLAN prior to the beginning of radio communication session.
Figure 2:
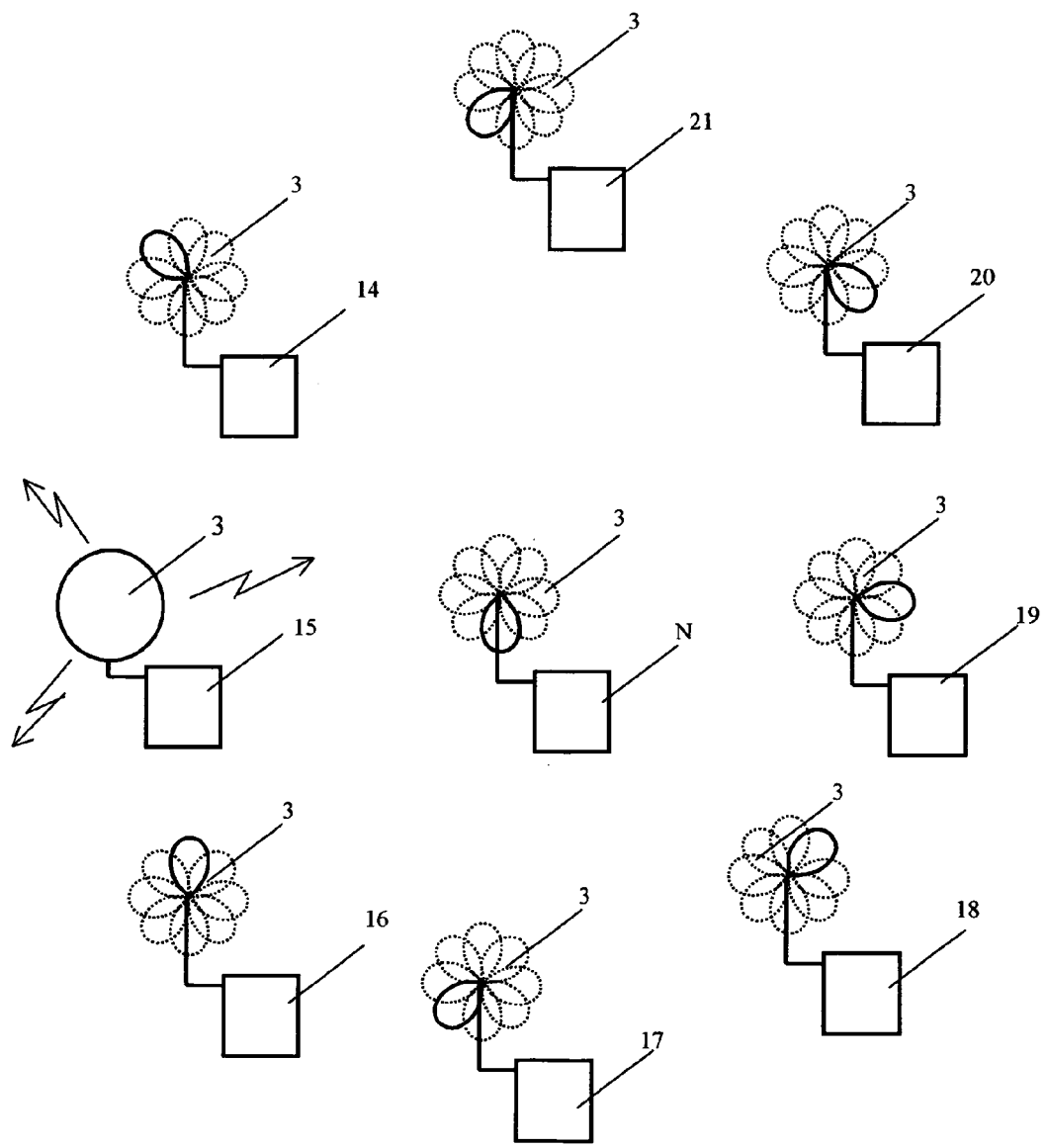
FIG. 2 illustrates the operation of antennas of transceiving devices of WLAN at an instant when one of these transceiving devices is switched-over in the transmission mode.
Figure 3:
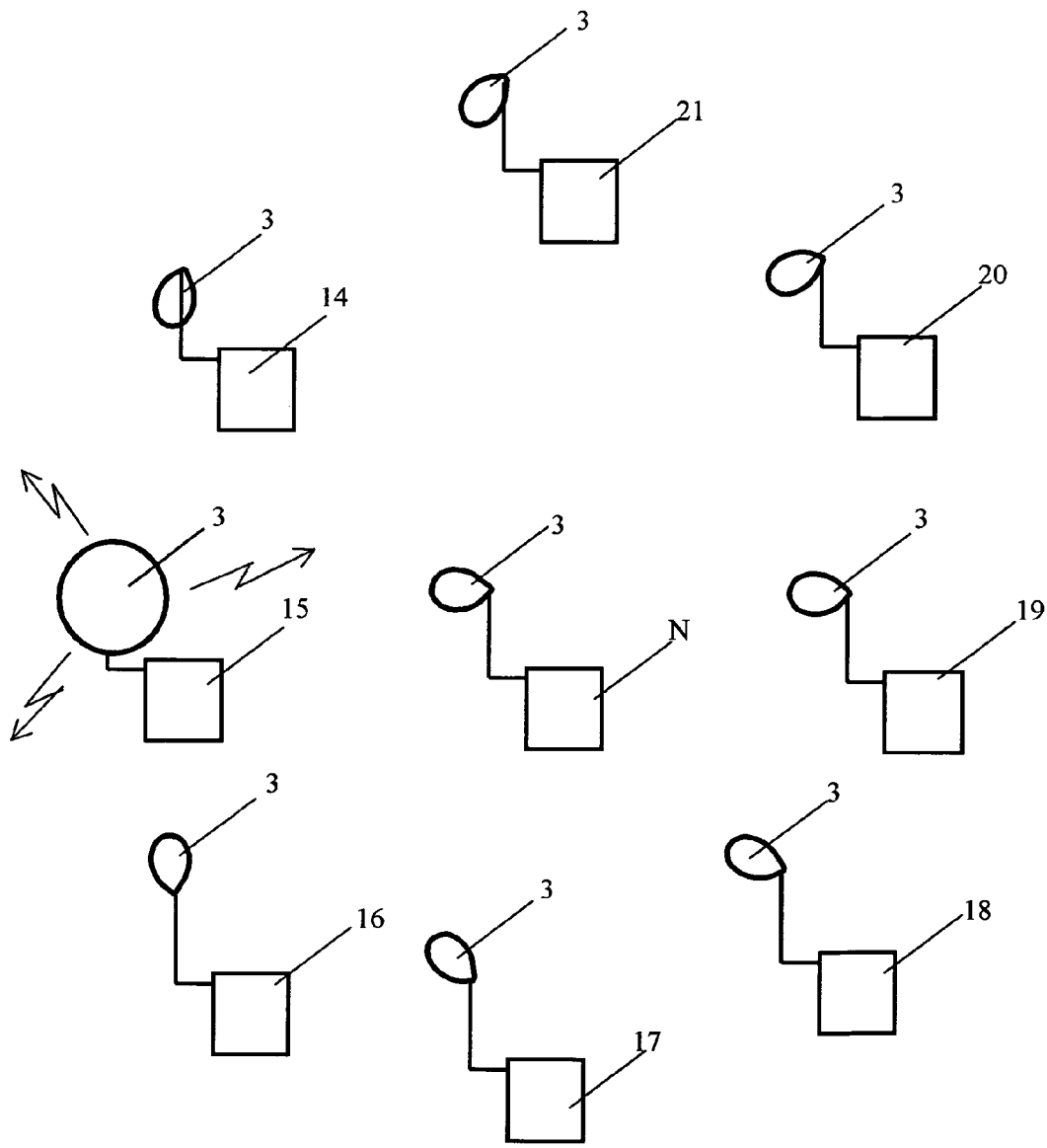
FIG. 3 illustrates the operation of antennas of transceiving devices of WLAN in the course of the transmission of information.
Figure 5:
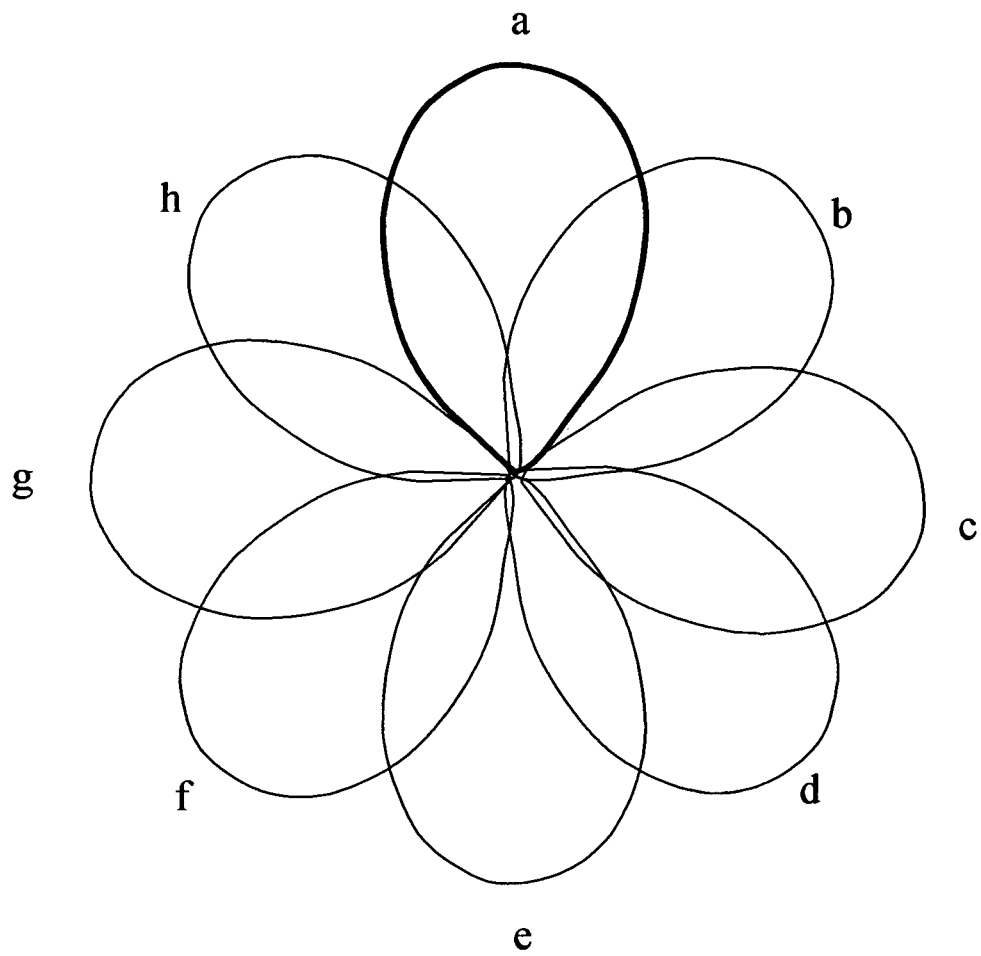
FIG. 5 shows certain possible positions (a, b, c, d, e, f, g, h) of a directional pattern of an antenna of a transceiving device.

Prior to a radio communication event (see FIG. 1), all WLAN users 14, 15, 16, . . . N perform scanning of radio space by means of antennas 3 that operate in directional mode. Said scanning may be performed in different ways—namely, by azimuth bearing (FIG. 5), by the angle of elevation, or jointly by azimuth bearing and the angle of elevation thus covering the hemisphere or entire sphere of the radio space. The scanning may be performed in a different manner—namely, step-by-step scanning (including step-by-step scanning in such a part of radio space that offers better conditions for signal reception, with said part being identified in advance), scanning with a pitch of 45°, 60°, 90°, 120°, or 180° by means of electronic switching of directional pattern, and by other known scanning methods. After one of the users makes a decision to transmit data (for example, user 15), he/she checks the air scanning the radio space for this purpose with a directional antenna 3 with the aim to eliminate collisions. If the radio space is free, antenna 3 of user 15 is switched-over into omnidirectional mode (this is done by means of directional pattern switchover unit 4), movable contact 5 of reception/transmission mode switch 6 is connected to the output port of transmitter 10 and then transmission of calibration signal and data is started (FIG. 2). As this takes place, other WLAN users (i.e. 14, 16 . . . N) continue scanning the radio space with antennas 3 operating in the directional mode. The search for the source of calibration signal is carried out in this operation mode. As soon as some of users 14, 16 . . . N, detect the calibration signal (this detection is performed by signal detection unit 13), they measure the value of one of the energy-related parameters (for instance, signal level or signal-to-noise ratio) of this signal at different positions of directional pattern of antenna 3 (this measurement is taken by means of signal quality measurement unit 12). Additionally the measurement of an energy-related parameter value can be taken at different polarization of a signal. Results of measurements are then forwarded to controller 11, which generates a control signal to set antenna 3 in the direction of reception corresponding to the best or specified quality of a signal being received, after which all above-indicated users switchover into the reception mode of data, which are forwarded into controller 11 from receiver 8 (FIG. 3).

Figure 4:
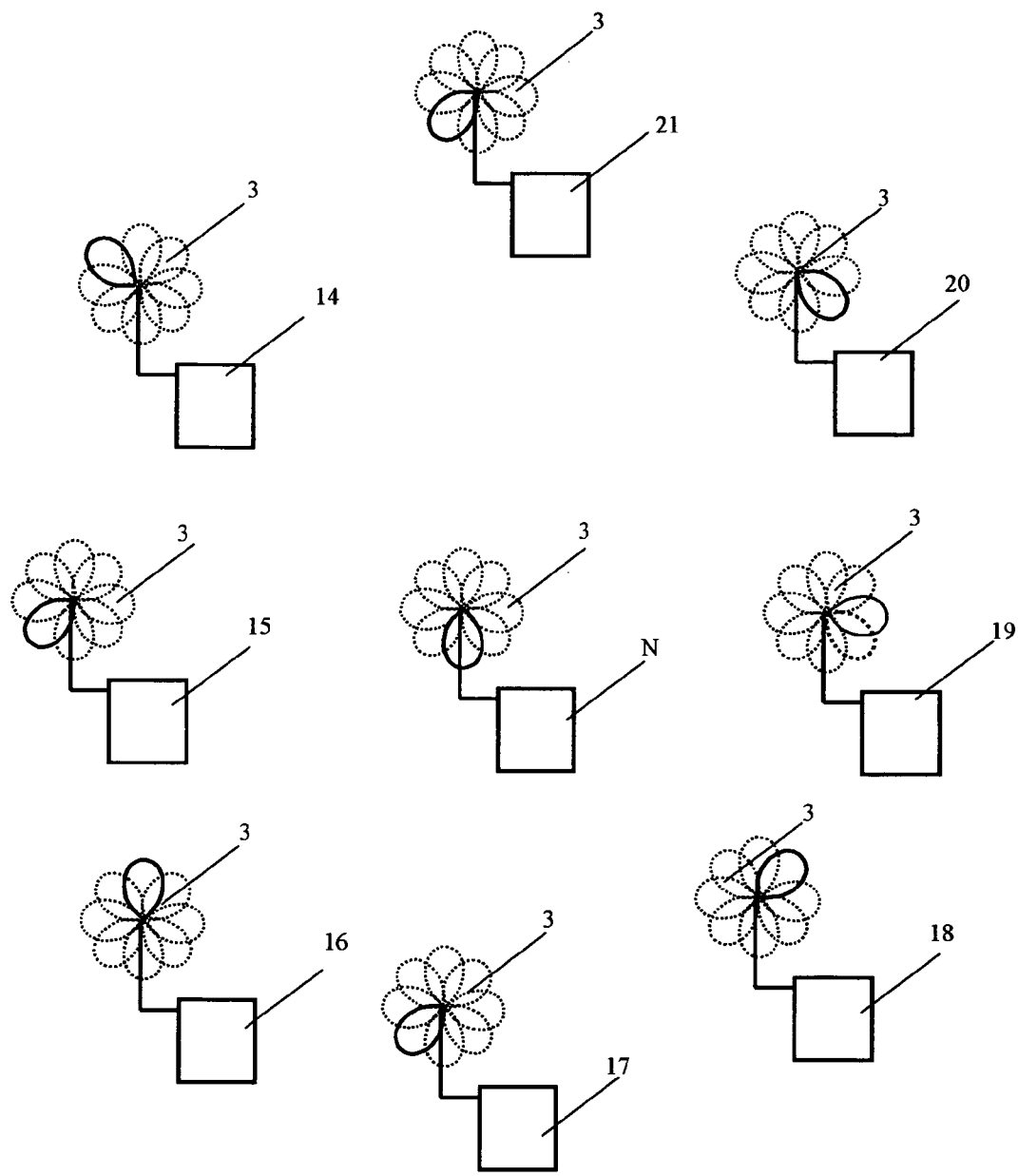
FIG. 4 illustrates the operation of antennas of transceiving devices of WLAN upon the completion of radio communication session.
Figure 7:
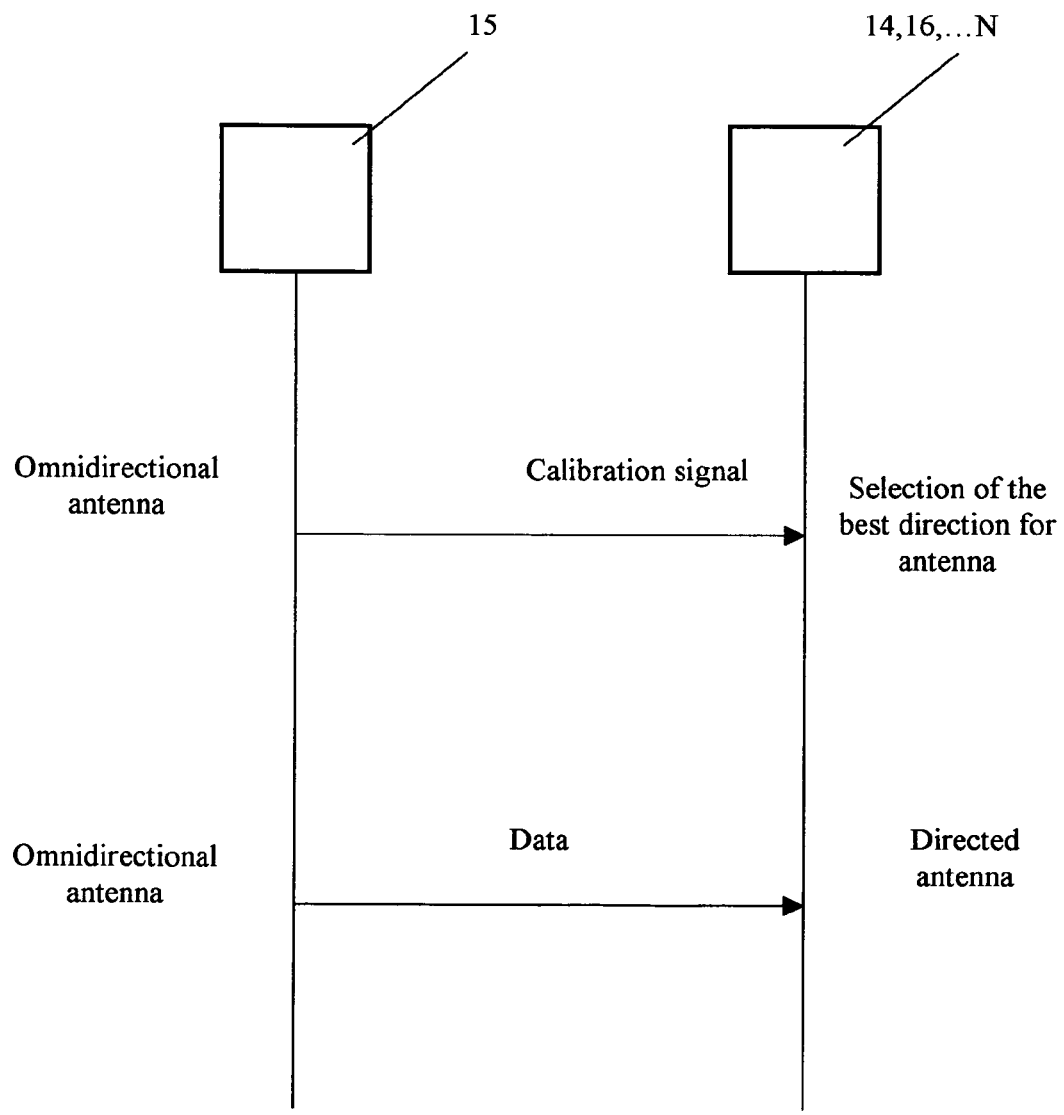
FIG. 7 illustrates the operation modes of antennas of transceiving devices in the course of radio communication, session.

The operation modes of antennas 3 of transceiving devices 1 of user 15 (who transmits data) and those users from the rest of users 14, 16 . . . N, who receive these data are shown in FIG. 7. When the value of one of the energy-related parameters drops below specified threshold value, the users (from users 14, 16 . . . N) who receive the signal resume scanning of the radio space. Upon the completion of transmission, antenna 3 of user 15 is switched-over into the scanning mode of operation (this is done by means of directional pattern switchover unit 4), movable contact 5 of reception/transmission mode switch 6 is connected to the input port of receiver 8 and then the network is reverted to the initial state (FIG. 4).

Technical Applicability

Figure 6:
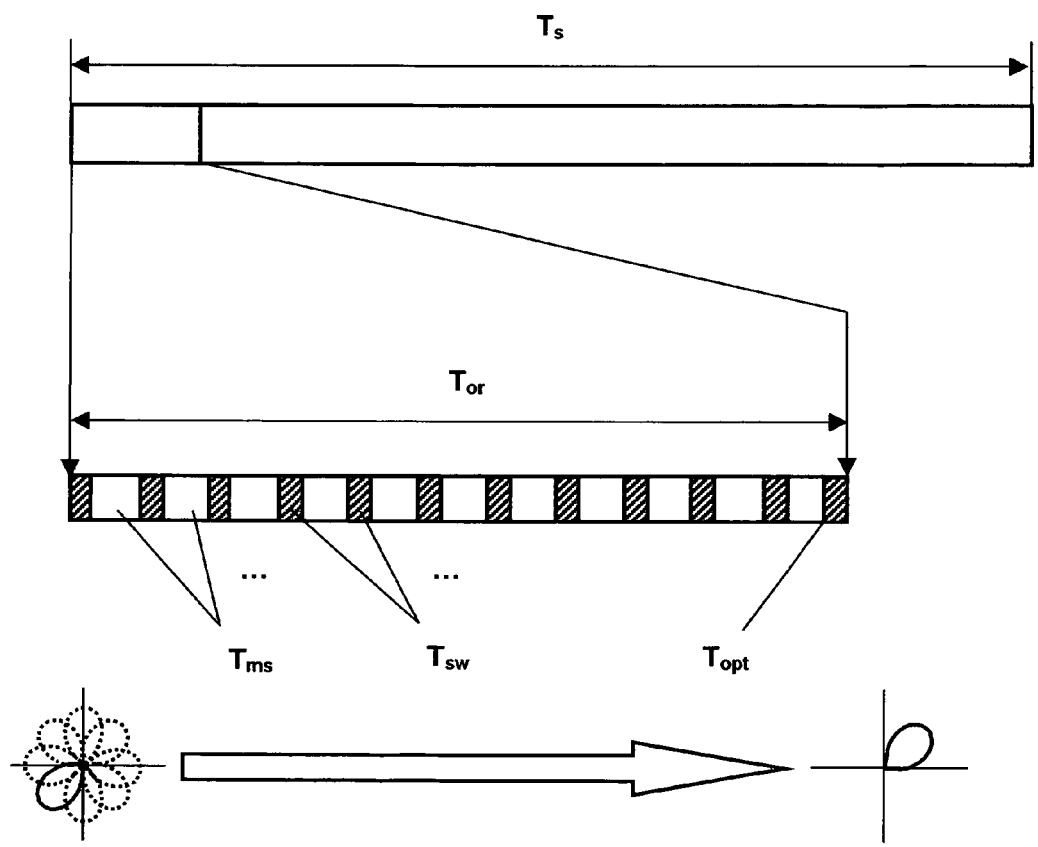
FIG. 6 presents a time diagram of the process of transceiving device antenna orientation by the example of WLAN operation in accordance to IEEE Standard 802.11 ($T_s$—synchronization field; $T_{or}$—total time of antenna orientation; $T_{ms}$—time of measurement of a level of a signal being received; $T_{sw}$—time of antenna switchover; $T_{opt}$—time of the last antenna switchover, after which the antenna beam takes the best position)

Using the method described above radio communication event was conducted in a WLAN in accordance with the following Standards: IEEE 802.11, IEEE 802.11a, IEEE 802.11b, ISO 8802-11 and HIPERLAN Type 2. Data are transmitted in packages in WLANs of these types. There is a mandatory part (called preamble) in the beginning of each data package. This preamble is intended for the tuning of receiver 8 and indication of the beginning of information transmission. Said preamble consists of two fields—namely, synchronization field and a field indicating on the beginning of information message (Start Frame Delimiter). Preambles are always transmitted at a minimum rate of 1 Mbps, which value corresponds to the maximum distance of reliable reception. The duration of the synchronization field in a short preamble is 56 □s. This synchronization field was used as a calibration signal for the purpose of orienting directional antenna 3 to signal source. An antenna the directional pattern for which was switched electronically (FIG. 5) was used for the practical implementation of the method claimed herein. During the reception of the synchronization field receiver 8 of users who receive the signal must perform certain actions the total duration of which amounts to 47 □s. Thus, time $T_{or}$, which can be used for orientation of antenna 3 is equal to 9 □s. In the worst case 15 measurements of signal level and switchovers of directional pattern of antenna 3 have to be performed during this time (16 measurements in the case of direct exhaustive search, 8 . . . 13 measurements or less in the case of optimized algorithms of scanning and search for the maximum of one of the energy-related parameters of a signal being received). The time of switching the directional pattern of antenna 3 is limited by the switching time of PIN-diodes and is equal to 100 ns. Time diagram of the orientation process of antenna 3 is presented in FIG. 6. Since the scanning rate allows one to direct antenna 3 to signal source during preamble time, then with the use of the method claimed herein there are no distinctions from the IEEE 802.11b protocol. It should be pointed out here that the reception of data package is performed by means of high-gain directional antennas 3, which fact allows one to expand the range of reliable reception quite significantly (increase of the radius of 11 Mbps reliable transmission/reception zone to the radius of 1 Mbps reliable transmission/reception zone).

References Cited
1. U.S. Pat. No. 6,026,303, Int. Cl. H04Q 7/00, publ. 15.02.2000.
2. U.S. Pat. No. 6,028,853, Int. Cl. H04J 3/06, publ. 22.02.2000.
3. U.S. Pat. No. 6,192,230, Int. Cl. H04B 7/14, publ. 20.02.2001.
4. U.S. Pat. No. 5,546,397, Int. Cl. H04B 7/04, publ. 13.08.1996.
5. U.S. Pat. No. 5,828,658, Int. Cl. H04Q 7/00, publ. 27.10.1998.
6. U.S. Pat. No. 5,748,676, Int. Cl. H04K 1/10, publ. 05.05.1998.
7. EPO Patent Application Serial No 99112131 and publication No. 1063789, Int. Cl. H04B 7/04, publ. 27.12.2000.
8. PCT/DE96/00020, publication No. WO 96/22646, Int. Cl. H 04 B 7/26, publ. 25.07.1996.

The invention claimed is:

1. A method for radio communication in a wireless local area network including a plurality of transceiving devices, the method comprising:
scanning simultaneously by each of a plurality of transceiving devices of a wireless local area network, the scanning performed by a direction-agile antenna of each of the plurality of transceiving devices operating in a scanning directional mode, each of the plurality of transceiving devices having means for operating the direction-agile antenna in the scanning direction mode, an omni-directional mode and a stationary directional mode;
transmitting an omni-directional signal in the form of a calibration signal by a transmitting device of the plurality of transceiving devices of the wireless local area network, the transmitting device operating in an omni-directional mode;
receiving the calibration signal as a result of the scanning by the plurality of transceiving devices in the scanning directional mode;
orienting the direction-agile antenna of each of the plurality of transceiving devices operating in the scanning directional mode in the direction of the transmitting device operating in omni-directional mode wherein a recognition and the orientation of the direction-agile antenna of each of the plurality of transceiving devices operating in the scanning directional mode is performed in the course of the reception of the calibration signal and each of the plurality of transceiving devices operate in a stationary directional mode;
transmitting a data package from the transmitting device in the omni-directional mode; and
receiving the data package from the direction at which the direction-agile antenna of each of the plurality of transceiving devices operating in the stationary directional mode has been oriented.

2. The method of claim 1 wherein the scanning is performed by azimuth bearing or/and by the elevation angle of the antenna of each of the plurality of transceiving devices in a reception mode.

3. The method of claim 1 wherein the scanning is performed step-by step by the antenna of each of the plurality of transceiving devices in a reception mode.

4. The method of claim 3 wherein step-by-step scanning is performed in the part of radio space that was determined in advance and that offers better conditions for signal reception.

5. The method of claim 1 wherein the scanning is performed by switching an antenna directional pattern of each of the plurality of transceiving devices in a reception mode.

6. The method of claim 1 wherein the scanning and orientation of the antenna beam of each of the plurality of transceiving devices in a reception mode in the direction of the transceiving device in the transmission mode is performed when transmitting each data package.

7. The method of claim 1 wherein at least one of a plurality of energy-related parameters of a signal received from the transceiving device in the transmission mode is measured in the course of scanning and the antenna beams of transceivers are oriented in the direction corresponding to the best or specified quality of at least one of the measured energy-related parameters of the signal being received.

8. The method of claim 7 wherein the level of the signal being received or signal-to-noise ratio is measured as one of the plurality of energy-related parameters.

9. The method of claim 1 wherein at least one of a plurality of energy-related parameters of the signal received from the transceiving device in the transmission mode is measured in the course of data package reception, and when the value of the at least one energy-parameter of the plurality of energy-related parameters turns out to be below a specified threshold value the scanning is resumed.

10. The method of claim 9 wherein the level of said signal being received or signal-to-noise ratio is chosen as the at least one energy-related parameter of the plurality of energy-related parameters.

11. The method of claim 1 wherein following the completion of transmission the transceiver is switched to reception mode with scanning performed by the antenna beam in different directions.

12. The method of claim 1 wherein prior to the beginning of the data package transmission the radio space is scanned to avoid collision of signals.

13. The method of claim 1 wherein the preamble of a data package to be transmitted is used as the calibration signal.

14. The method of claim 1 wherein the recognition of the signal is performed in the course of said signal reception.

15. A transceiving device for use in a wireless local area network composed of multiple transceiving devices for transmission of data package from one transceiving device to the multiple transceiving devices, the transceiving device comprising:
- at least one direction-agile antenna;
- a unit for switching the directional pattern of said antenna;
- a reception/transmission mode switch;
- a receiver;
- a transmitter;
- a unit for measuring signal quality;
- a unit for signal detection and a controller;
- wherein the at least one direction-agile antenna is connected to the unit for switching a directional pattern with a first port serving as a first input port when operating in a scanning directional mode, and when operating in a omni-directional mode the first port serves as a first output port of the reception/transmission mode switch, a second output port of which is connected to the input port of the receiver, and a second input port of which is connected to the output port of the transmitter, the output port of the receiver is connected simultaneously to the first input port of the controller, to the input port of signal quality measurement unit and to the input port of the signal detection unit, the output port of the signal quality measurement unit is connected to the second input port of the controller, to the third input port of which the output port of signal detection unit is connected, the first output port of the controller is connected to the unit for switching the directional pattern, the second output port of the controller is connected to the input port of the transmitter, and the third output port of the controller is designed to connect the third output port to a device intended for the reception and/or transmission of information;
- wherein the direction-agile antenna operates in a scanning direction mode, an omni-directional mode and a stationary directional.

16. The transceiving device of claim 15 wherein the transceiving device is equipped with at least one antenna having at least two radiators with directional patterns that together cover no less than 360 degrees by azimuth bearing or by an elevation angle.

17. The transceiving device of claim 15 wherein the transceiving device is equipped with at least one antenna having at least two radiators with directional patterns that together cover the sphere by azimuth bearing and by the angle of elevation.

18. The transceiving device of claim 15 wherein the transceiving device is equipped with at least one antenna having three radiators with directional patterns that together cover no less than the hemisphere by azimuth bearing and by the angle of elevation.

19. The transceiving device of claim 15 wherein the transceiving device is equipped with at least two antennas, with each antenna having only one radiator, and together directional patterns of these radiators cover no less than 360 degrees by azimuth bearing or by the elevation angle.

20. The transceiving device of claim 15 wherein the transceiving device is equipped with at least three antennas, with each antenna having only one radiator, and together directional patterns of these radiators cover the hemisphere by azimuth bearing and the angle of elevation.

21. The transceiving device of claim 15 wherein the transceiving device is equipped with at least two antennas, with each antenna having only one radiator, and at least four antennas, each of which having at least two radiators, and, together directional patterns of all these radiators cover the sphere by azimuth bearing and by the angle of elevation.

* * * * *